(Model.)

D. W. DORRANCE
LOG TURNER.

No. 321,803. Patented July 7, 1885.

Attest:
Elliott P. Hough
C. E. Jones

Inventor.
David W. Dorrance.
By Chas. J. Gooch
his Attorney.

UNITED STATES PATENT OFFICE.

DAVID W. DORRANCE, OF MOORE'S SALT WORKS, OHIO.

LOG-TURNER.

SPECIFICATION forming part of Letters Patent No. 321,803, dated July 7, 1885.

Application filed April 21, 1885. (Model.)

*To all whom it may concern:*

Be it known that I, DAVID W. DORRANCE, a citizen of the United States of America, residing at Moore's Salt Works, in the county of Jefferson and State of Ohio, have invented certain new and useful Improvements in Log-Turners; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification This invention relates to Log-Turners employed on saw-mills to turn the logs on the head-blocks; and it consists in a novel device for the purpose, consisting of a V-shaped frame having at its narrowest end a swivel or swiveled block, upon which the frame is supported on the ground, and at suitable distances apart along the side bars angularly-projecting pins, hooks, or teeth, all as hereinafter more fully described and claimed.

Figure 1:
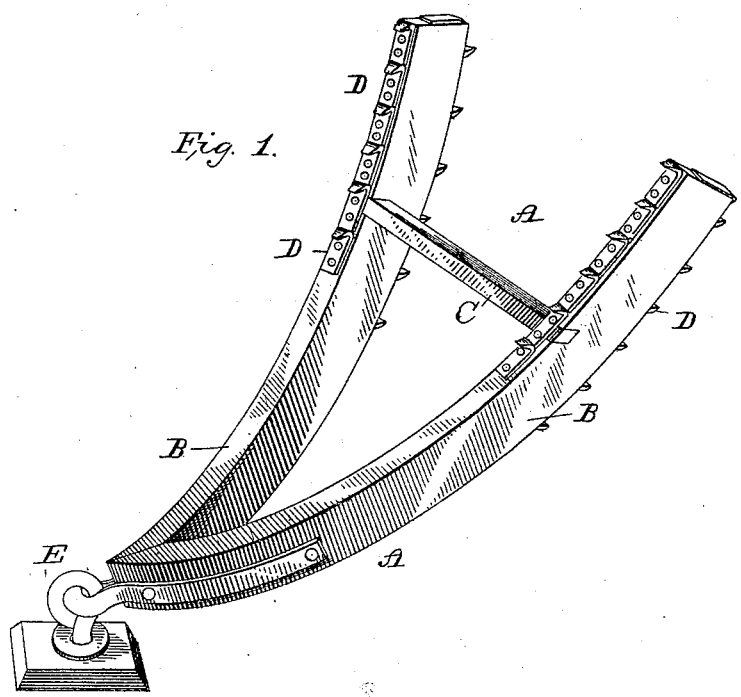
Figure 2:
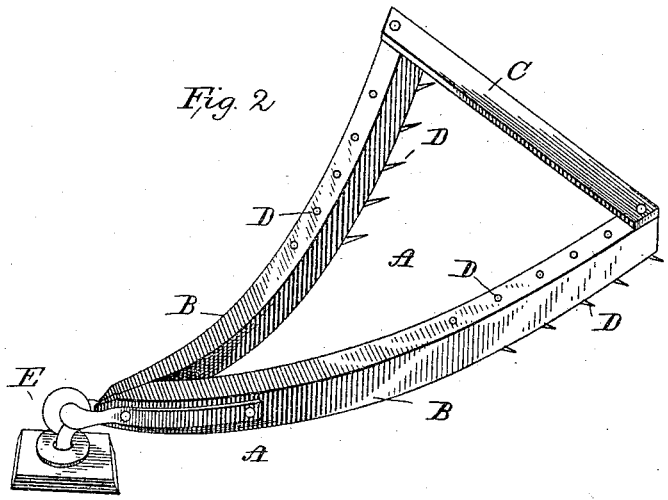

In the accompanying drawings, Figure 1 represents a perspective view of my improved log-turner. Fig. 2 represents a modified form thereof.

My improved log-turner is exceedingly simple in construction, has no complicated arrangements or multiplicity of parts to get out of order or require attention and manipulation, but, on the contrary, can be readily and cheaply constructed by unskilled workmen and applied in and removed from position by ordinary operatives, and is automatic in its action, thereby possessing decided advantages over those log-turners depending for their operation upon their connection with and actuation by mechanism either under the control of an attendant or connected with the sawing-machine.

A represents the log-turner, which is V-shaped, as shown, the frame being composed of side bars, B B, connected directly together at their lower ends, and a cross bar or brace, C, connecting and bracing the bars B together at or near their upper ends. These bars may be of any suitable metal or material, and may be straight or curved, and either formed separately and bolted or otherwise secured together at their connecting-points, or the frame may be cast or otherwise formed in one or more pieces, as found convenient or desirable.

D represents prongs, pins, teeth, or hooks extending outwardly from the side bars, B.

In my preferred form the side bars, B, are formed of curved shape, as shown in Fig. 1, and have the points of the hooks, pins, or teeth D formed on or attached to the concaved faces of the side bars projecting downward, while the points of such pins or hooks on the convex side extend in an upward direction.

In the form of turner shown in Fig. 2 only one side is provided with teeth, the points of which are shown as extending at an upward angle, though they may be arranged to extend downwardly, if desired. These teeth may be of steel or any strong material, and of any number and form desired, according to the size and quality of the logs to be turned. Ordinarily ten or twelve of such teeth, &c., one-half in or on each side bar B, is found sufficient. These teeth may be either formed integrally with the side bars or be provided with lips or flanges and bolted or riveted in position, or the bars may be formed with suitable slots or holes, within which the teeth, &c., are inserted and riveted or otherwise secured. These teeth, &c., are arranged in position about six inches apart, commencing from or near the upper ends of the respective bars B.

The frame may be constructed of any suitable size, although I find that a convenient size for the respective parts is to make the side bars, B, about two and a half inches wide by three inches thick, and from four to six feet long, with the space between them gradually spreading from the bottom outward up to about three feet in width at the upper end. To the lower end of the frame is connected a swivel or swiveled block, E, which rests upon the ground and serves as a support for the turner, so as to permit of the turner being oscillated and turned around.

In use the turner A is placed right behind the sawyer, about two feet from the carriage, with its swiveled support E resting upon the surface of the ground where the ground is level, but where the ground is uneven it may be necessary to make a hole therein to receive the turner-support so as to bring it to the required height for operation.

When the log-turner is to be used for turning a log, it is stood or leaned up against the log with the teeth in contact therewith. The carriage is then run back and forth the necessary number of times to turn the log to the desired extent, it being readily understood that as long as the carriage is moved back and forth so long does the log turn. When the reciprocating motion of the carriage ceases, the pins or teeth D will hold the log steady until dogged. When the log has been dogged, that side of the turner that is loose is raised. The carriage is then run either backward or forward, according to which side of the turner is holding the log, and the log-turner is thus loosened from the log. The turner A then can be thrown back toward the log-yard and out of the way until again needed. Neither mechanism nor the attendance of any operative is required to hold the turner to its work, as it will stick to the log itself. In the turning of small logs this turner saves the employment of one operative, while where larger logs have to be turned a saving of two or more employés is effected, as by reason of the arrangement of teeth shown the device will turn either large or small logs with equal facility, and even more quickly than could be done by hand.

By constructing the frame with curved side bars, and providing the concave faces with teeth or hooks having their points extending in a downward direction and with the points of the teeth on the convex side extending in an upward direction, I am enabled to turn a log whatever its position. For instance, by turning the frame upon its swivel or pivoted support E so as to bring the convex side of the frame toward or against the log it will roll the log around in a direction away from the turner, while when the opposite or concaved side of the frame or turner is presented to the log the turner will roll and draw the log toward it. When it is desired to cause the turner to draw the log around toward it, the block E will be clamped rigidly in position.

Having thus described my invention, what I claim is—

1. A log-turner composed of bars connected together at their lower ends, and from thence extending upwardly and outwardly in a sidewise direction, and having at their upper portions outwardly-extending pins or teeth.

2. A log-turner composed of a V-shaped frame, having at its narrow or pointed base a swivel-support, and at its upper portion a series of outwardly-projecting teeth, substantially as and for the purpose set forth.

3. A log-turner composed of upwardly and outwardly extending side bars, each having at its upper portion a series of outwardly and upwardly projecting teeth, and a cross bar or brace connecting the bars together, and a swiveled support connected to the connecting lower ends of said bars, substantially as shown and described.

4. A log-turner having outwardly and upwardly extending curved bars provided on their concave faces with downwardly-projecting pins, teeth, or hooks, and on their convex faces with upwardly-projecting pins, teeth, or hooks, and having a pivotal base-support.

In testimony whereof I affix my signature in presence of two witnesses.

DAVID W. DORRANCE.

Witnesses:
BELLE SALTSMAN,
JEFF SALTSMAN.